Aug. 27, 1963 W. GRUBER 3,101,764
TIRE PATCH
Filed Dec. 28, 1961 2 Sheets-Sheet 1
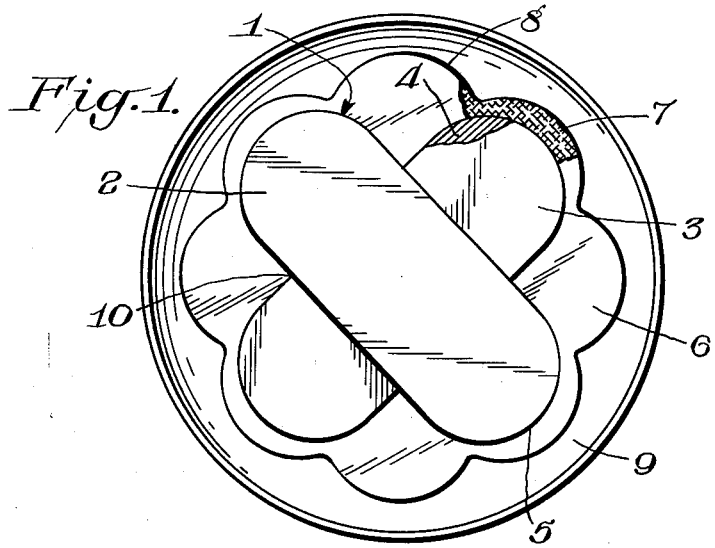
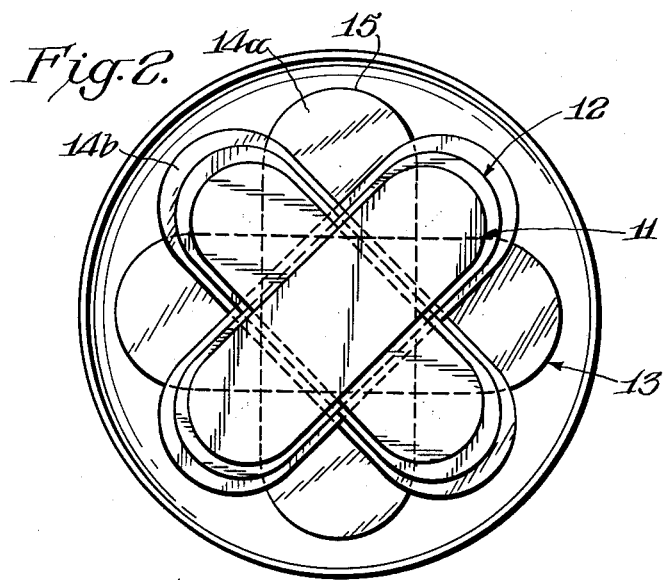
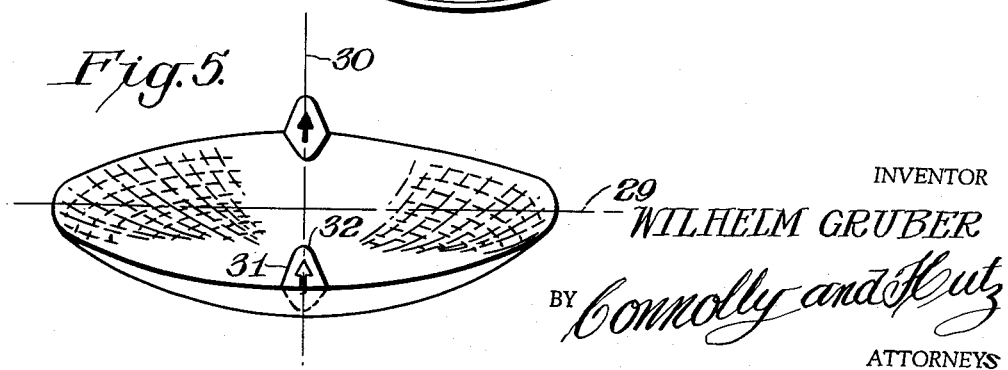
INVENTOR
WILHELM GRUBER
BY Connolly and Hutz
ATTORNEYS Aug. 27, 1963  W. GRUBER  3,101,764
TIRE PATCH Filed Dec. 28, 1961  2 Sheets-Sheet 2

INVENTOR
WILHELM GRUBER
BY Connolly and Hutz
ATTORNEYS

United States Patent Office 3,101,764
Patented Aug. 27, 1963

3,101,764
TIRE PATCH
Wilhelm Gruber, Munich, Germany, assignor to Stahlgruber Otto Gruber & Co., Munich, Germany, a firm of Germany
Filed Dec. 28, 1961, Ser. No. 162,856
Claims priority, application Germany Jan. 4, 1961
10 Claims. (Cl. 152—367)

The present invention relates to patches for repairing holes, tears, or other kinds of damage in pneumatic vehicle tires, after the area around the place of damage has been cleaned and roughened by covering the place of damage and by bridging the interrupted structure of the reinforcing carcass of the tire.

All of the known patches of this type have the same general features insofar as their shape, structure, and material are concerned. They consist of a main body of unvulcanized or vulcanized rubber with a number of reinforcing inserts therein depending upon the size of the patch, and of a so-called connecting layer of unvulcanized rubber on the surface to be applied to the tire or the like for producing a solid connection between the patch body and the tire either by hot or cold vulcanization.

The solidity of the patch body is determined by the reinforcing inserts of rubberized cord material, that is, by the parallel cord threads of the individual layers which are embedded in the rubber. In order to utilize the tensile strength of the cord threads in several directions (the cord layers of each pair are arranged to form a cross band in which the cord threads of one layer cross those of the other layer. Such a cross band which usually comprises several superimposed crossing layers is intended to bridge the place of damage so solidly that the patch will withstand the tensional stresses occurring in the respective thread direction of the tire and will prevent the occurrence of bulges which are caused by the internal pressure of the tire at the place of damage.

Since large places of damage in tires are usually believed to require patches with a considerable number of reinforcing inserts of cord fabric, such patches are relatively thick and of a large size and consequently lead to an unbalance of the tire and undesirable high temperatures at the repaired place.

Although attempts have been made to increase the solidity of the patch body by reinforcing inserts of a metal fabric, such patches have not proved successful in actual practice, especially because the difference in the elasticity, on the one hand, between the wire fabric and the tire and, on the other hand, between the wire fabric and the rubber body of the patch is sooner or later bound to lead to a separation of the patch from the tire and even to a separation of the layers of the patch.

A tire patch which complies with the requirements of securely and permanently sealing the place of damage must be solid and stiff at the area which covers the damaged place, but its marginal parts must have a certain elasticity since the working movements of the tire while running along a road exert continuously changing tensions and thrusts upon the patch and especially upon the marginal parts thereof so that a separation of the patch from the tire or even a destruction of patch will occur primarily at these marginal parts.

Tire patches with reinforcing inserts of cord material possess a high tensile strength in the direction of the cord threads which generally is very desired, while in a direction at a right angle thereto and outside of the cross connection between the cord layers, the cord material has no solidity since any tension acting in this direction can be taken up only by the rubber coating which connects the cord threads. The tensile and tangential stresses to which a tire is subjected while running on a road, and thus also the tensile and tangential stresses which are transmitted to a patch which is secured to the tire are of a very complex nature since they are produced not merely by the effect of the rolling of the tire peripherally along the road, but also by the effects of flattening the tire on the road surface and especially by the effects caused when lateral pressures are exerted upon the tire when driving along curves. Especially the edge portions of the reinforcing inserts are then subjected to stresses of a strength which the rubber coating which holds the cord threads together is unable to bear. This results in tears at all those points where only one cord layer is present which is not directly connected to other layers, that is, especially at the edges of the reinforcing inserts. The danger of the formation of such tears is further increased in the known tire patches by the fact that the rubber coating and the projecting rubber edge will be stretched at the marginal part of a patch considerably more than the cord material. The forces acting upon the edges of the patch and the great change is solidity at the points where the cord threads end and only the rubber embedding remains result in the fact that at the ends of the cord threads the patch tears away from the rubber or the reinforcing layer separates from the enveloping rubber. All those patches which have a built-up cross or star-shaped reinforcing core, also have especially endangered points at the inner corners which are formed by superimposing the individual cord layers or strips in a crosswise arrangement. Such tears and separations are transmitted within a short time to the rubber enveloping the reinforcing inserts in the form of tears in the patch body, and they also wear upon and pinch the inner tube within the tire with the result that the inner tube may also tear and the tire may have a blowout. Furthermore, as soon as such a tear develops at the edge of the patch, the torn part will sever from the tire inwardly from the edge. Even in tubeless tires it is very dangerous if a patch becomes damaged since the compressed air can then penetrate into the carcass through the cord threads which have become exposed by the roughened material. This compressed air which penetrates into the carcass and is at first prevented from escaping to the outside leads to separations within the fabric and finally to the separation of the breaker from the carcass.

Tears in the reinforcing layers of cord material and even a separation of the individual layers from each other may also be caused by the so-called "shearing effect" to which the patch is subjected at the place of damage. It is quite evident that the tensile and tangential stresses which are exerted upon a patch in different directions lead to a parallel displacement of the reinforcing layers since the cord threads thereof are merely held together by rubber. Thus, for example, a reinforcing layer of a rectangular shape may then be distorted to the shape of a parallelogram in which the inclination of the shorter sides changes constantly.

This shearing effect to which the reinforcing layers of the carcass of a tire are to some extent subjected occurs very strongly especially at a place of damage of a tire since the reinforcing structure within the tire has at such a point been interrupted. This shearing effect also increases the heat which occurs at the place of damage.

What this means is clearly evident to any person who is familiar with this art since he knows that any excessive heating of a tire—even of one which is undamaged—is very detrimental to the tire and that, if such excessive heating occurs at a patched place, there is a great danger of a blowout.

It is an object of the present invention to overcome all of the aforementioned disadvantages of the conventional tire patches by providing a patch in which not only the solidity of reinforcing inserts of cord material is more fully utilized than in previous patches but in which especially any excessive expansion which might occur at the ends of the cord material and of the rubber layer and in which the cord material is embedded is prevented by being gradually taken up and compensated in accordance with the elasticity of the marginal rubber of the patch, and in which the detrimental effect of excessive tensions which might lead to a tearing of the reinforcing inserts is also eliminated. This is attained accordng to the invention by providing a very particular design and structure of the renforcing core of a patch and by the provision of suitable means for taking up and dissipating the excessive tensions which may occur. For this purpose the present invention provides the production of reinforcing layers which consist of a combination of cord material and layers or disks of other fabrics.

With reference to the accompanying drawings, several preferred embodiments of the invention will now be described in detail. These embodiments do, however, by no means represent all of the designs and constructions in which the invention may be carried out and particularly the shape of the patches, their reinforcing cores, and the layers forming the latter may be entirely optional. Thus, for example, these layers may be of a circular, rectangular, rhomboid or striplike shape. For securing the patch to the tire, the layers of the patch may consist either of unvulcanized rubber or the individual layers may be vulcanized together to form a pack which is molded to the desired shape of the patch. The accompanying drawings merely illustrate tire patches of one preferred shape which is frequently used today in which the reinforcing core consists of strips of cord material which are superismposed upon each other in a crosswise or star-shaped arrangement, and in which this reinforcing core is embedded in a patch body of vulcanized rubber of a curved shape. Such a patch with a fully vulcanized patch body is equally suitable for the repair of a tire either by hot or cold vulcanization.

In the drawings,

FIGURE 1 shows a plan view of a patch according to a simple embodiment of the invention without a rubber covering layer;

FIGURE 2 shows a plan view of a patch according to a modification of the invention, likewise without the covering layer;

FIGURE 4 shows a plane view of a further modification of the invention which results in a patch of a very small thickness; while FIGURE 5 shows a perspective view of a complete patch according to the invention which is made of a particular shape.

Figure 3:
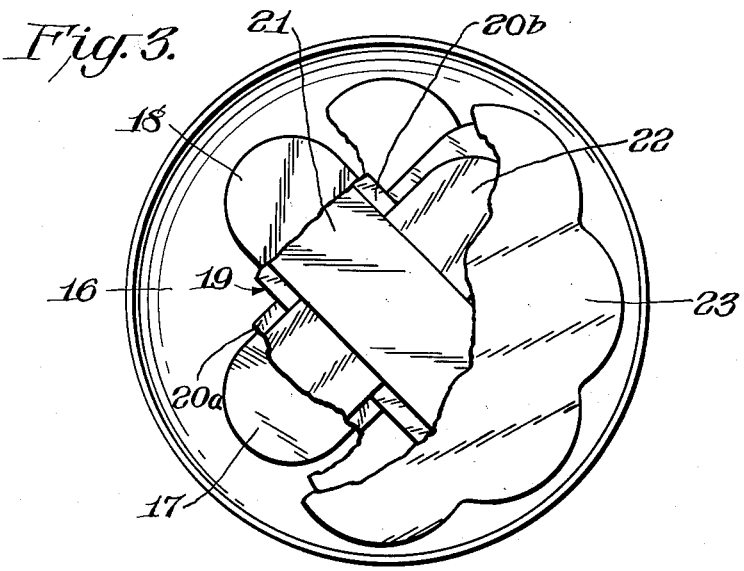
FIGURE 3 shows a plan view of a patch according to a further modification of the invention, in which parts of the successive layers are removed from the left toward the right.

The tire patch as illustrated in FIGURE 1 comprises a reinforcing cross band, generally indicated at 1, which consists of two superimposed reinforcing layers 2 and 3 of cord material extending at right angles to each other. The individual cord threads of layer 3 are indicated at 4 and they are connected to each other by a rubber coating which fills out the intermediate spaces. The narrow sides 5 of the reinforcing inserts 2 and 3 are spherically rounded in the conventional manner in order to avoid tensions.

According to the invention, this cross band 1 rests on a layer of a rubberized fabric 6, the warp and weft threads of which are indicated diagrammatically at 7. This layer 6 has a rosette-shaped outer edge 8, and it rests, in turn, on a rubber base 9 which determines the outer shape of the patch. Another layer, not shown, similar to the rubber base 9 forms a covering layer. If the patch is to be of the prevulcanized type for being applied by cold vulcanization, all layers of the patch are vulcanized together, for example, in a mold, and then produce together with the connecting layer a body of a curved cross section with a pointed outer edge.

While a material made of cord threads has a very high tensile strength and low elasticity in the direction of its threads and a low tensile strength but a high elasticity in the direction transverse thereto, a normal fabric may be made so as to have an equal tensile strength and elasticity in two directions extending at right angles to each other. By combining the material of cord threads with such a normal fabric in accordance with the invention, it is possible to prevent excessive stresses occurring at the edges of the cord layers and in the corners 10 from leading to dangerous destructive tension peaks since these tensions will be taken up by the fabric 7 which is capable of stretching in several directions. The cord threads outside of the cross connection which are merely embedded in rubber are thus prevented to a considerable extent from shifting in lateral directions, the possibility that the cord threads will be torn out of the rubber is prevented, and the parts of the patch at and around the place of damage are subject to less movements and to being heated. The common tearing of the marginal portions and in the corners is prevented by the effect of the additional two-way fabric which preferably has an elasticity similar to that of the enveloping rubber. The entire patch body is in this manner solidified and stiffened without any reduction of the desired elasticity. The connection of the cord threads to the additional fabric layer also substantially prevents any shearing of the cord threads, and even though the both cord layers 2 and 3 together are connected to the fabric layer 6 only at the crossing area where they are directly superimposed upon each other, the fabric layer 8 serves as an additional connection and solidification of both cord layers which extends to the outer ends thereof. The individual threads can therefore not move independently of each other or in different directions, and separations and tears are thus prevented. In consequence of the invention, the new tire patches are also adapted for application in so-called bead tires which, because of their excellent driving properties are presently in strong demand. This type of tire contains one or more lower bead layers with a thread direction extending from one bead to the other and in which the threads lie within planes extending through the wheel axes, and it also contains one or more tread layers the threads of which extend in the peripheral direction. The good driving properties of these tires are partly due to the fact that, when the tire rolls along and is flattened on the road, the threads extending parallel to each other within the bead and tread surface layers are spread apart because of the elasticity of the rubber connecting the same. If a normal cross patch would be applied to a place of damage in the tire, such a patch would be incapable of covering and bridging the damaged place securely since such a tire has a considerably greater elasticity between its layers than normal tires and the area between the tread surface and the bead has a much greater tendency toward working movements.

FIGURE 2 illustrates the inventive structure of a tire patch in which several reinforcing crosses of cord material, generally indicated at 11 and 12, are provided. The structure differs from that according to FIGURE 1 further by the fact that the normal fabric layer 13 is composed of individual strips 14a, 14b etc. the narrow sides 15 of which are arcuately rounded and produce a rosettelike outer shape. The preferred directions of the solidity and elasticity of this layer 13 which are determined by the warp and weft threads are in this manner uniformly distributed over the entire surface of the patch so that this embodiment of the invention has a still greater ability to take up the stresses acting upon the crossing layers of cord fabric 11 and 12 than the embodiment according to FIGURE 1.

A further modification of the invention is illustrated in FIGURE 3, in which the circular base 16 supports two reinforcing layers 17 and 18 of cord material which cross each other at right angles. Upon these layers 17 and 18 a normal fabric layer 19 is applied which also in this case is composed of individual strips 20a, 20b, etc. This fabric layer 19, in turn, supports the upper reinforcing cross which consists of rectangular crossing strips 21 and 22 of cord material so that the fabric layer forms an intermediate element which connects the crossing layers 17, 18 and 21, 22 and takes up the tensions therefrom and solidifies the same. The upper covering layer 23 likewise consists of rubber. If the patch is of the prevulcanized type, all layers thereof are connected to each other by vulcanization and, since the number of superimposed layers decreases from the center of the patch toward the outside, the body of the patch has a lenticular or curved cross section.

The reinforcing layers 17 and 18 of the patch according to FIGURE 3 which when the patch is applied are closest to the place of damage are made of a greater width than the upper layers 21 and 22.

As illustrated in FIGURES 1 to 3, the fabric layer or layers which carry the reinforcing layers of cord material on one or both surfaces may project considerably over the edges of the cord material since in this manner it is possible to attain the desired tension release as reliably as possible. Aside from this, the inventive reinforcing structure of a tire patch permits many different modifications and combinations of the relative association of the cord layers and fabric layers. Thus, for example, the reinforcing body of cord layers may be covered at one or both sides by a fabric layer or the fabric layers may also be placed between the cord layers. The fabric layers may be made of different diameters in accordance with the associated cord layers and each of them may also consist of several superimposed layers, provided the feature is attained that the free ends of the cord threads are solidified by the fabric and that at these points a fabric layer is provided for taking up and dissipating the tensions from the cord layers.

Figure 4:
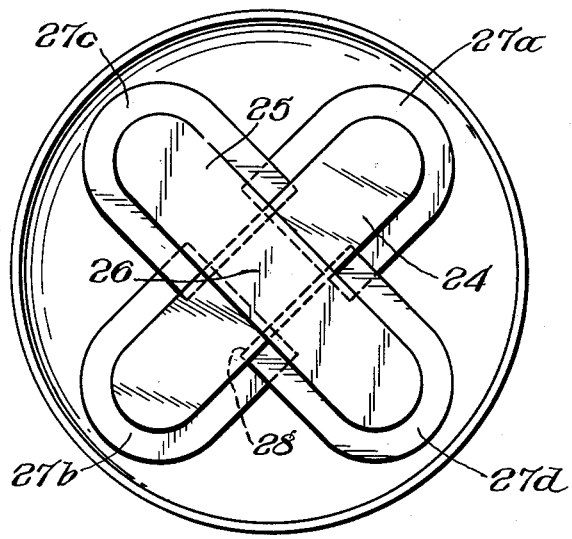

A further embodiment of the invention is illustrated in FIGURE 4. The reinforcing cross 24, 25 which consists of two cord strips is similar to the reinforcing cross 2, 3 according to FIGURE 1. The stiffening fabric layer which conducts away the tensions is here, however, provided only at those points where it is particularly required, namely, only outside of the actual reinforcing core 26 which is formed by the crossing cord threads. The fabric layer therefore consists of end strips 27a to 27d of a length so as only to overlap each other and to reach over the edges of the cord strips 24 and 25 to the points 28. By this feature the tire patch becomes considerably thinner and lighter and is therefore less heated by friction when in use. The reduction in cost by the saving in the amount of special fabric is also a valuable feature of this patch.

The cord threads of all embodiments of the invention may consist either of nylon or rayon cord or of a combination of both, for example, in such a manner that one reinforcing strip consists of nylon cord and the next of rayon cord or that each strip contains both nylon and rayon threads which either alternate with each other individually or in groups. In this manner it is possible to utilize at the same time the advantages of the greater tensile strength of the nylon cord at higher temperatures and of the lower elasticity of the rayon cord. Furthermore the disadvantage may thus be overcome that a patch which only contains, for example, rayon cord, might be applied to a tire the carcass of which happens to contain only nylon cord with its different properties.

It also frequently occurs that by the very act of installing a tire patch in a damaged tire undesirable increased tensions are produced within the patch which may later lead to its destruction or to a blowout of the tire. This may occur especially if the vulcanized mold is too large for the respective tire or if an excessive pressure is exerted upon the patch. The cord layers may then be displaced or distorted, especially in a direction transverse to the direction of the cord threads. Such distortions may result in tears even during the vulcanization of the patch, and especially they will considerably increase the danger of the occurrence of tears in the patch while the tire is in use on the road. In order to overcome these disadvantages, it is advisable to make the prevulcanized tire patch of a curved or lenticular shape as illustrated in FIGURE 5, with a curvature which approximately corresponds to the curvature which the patch will have when installed in the damaged tire in the peripheral direction relative to the axis 29 and to the axis 30. In order to facilitate the application of the patch to the place of damage, the patch is preferably provided with small tabs 31 of linen or the like serving as handles and provided with a pointed end 32 which indicates the direction in which the patch is to be installed so that the direction of the cord threads of the reinforcing layers which are closest to the inner wall of the tire and therefore are the first to become effective will be substantially in alignment with the thread directions of the tire.

Although my invention has been illustrated and described with reference to the preferred embodiments thereof, I wish to have it understood that it is in no way limited to the details of such embodiments, but is capable of numerous modifications within the scope of the appended claims.

Having thus fully disclosed my invention, what I claim is:

1. A tire patch comprising a reinforcing core consisting of a plurality of layers of rubberized cord threads embedded in rubber and superimposed upon each other so that the cord threads of the individual layers extend at an angle to each other, and at least one rubberized reinforcing layer of fabric having warp and weft threads intimately secured to said reinforcing core and extending beyond the entire area defined by said core.

2. A tire patch comprising a reinforcing core consisting of a plurality of layers of substantially parallel rubberized cord threads embedded in rubber and superimposed upon each other so that the cord threads of the individual layers extend at an angle to each other, and at least one rubberized reinforcing layer of fabric having warp and weft threads at least partly covering and intimately secured to said reinforcing core and extending beyond the entire area defined by said core.

3. A tire patch comprising a reinforcing core consisting of a plurality of layers of substantially parallel rubberized cord threads embedded in rubber and superimposed upon each other so that the cord threads of the individual layers extend at an angle to each other, and at least one rubberized reinforcing layer of fabric having warp and weft threads interposed between and intimately secured to the layers of said reinforcing core and extending beyond the entire area defined by said core.

4. A tire patch comprising a reinforcing core consisting of a plurality of layers of substantially parallel rubberized cord threads embedded in rubber and superimposed upon each other so that the cord threads of the individual layers extend at an angle to each other, and at least one rubberized reinforcing layer of fabric having warp and weft threads covering and intimately secured to each side of said reinforcing core extending beyond the entire area defined by said core.

5. A tire patch comprising a reinforcing core consisting of a plurality of first strips of substantially parallel rubberized cord threads embedded in rubber and superimposed upon each other, so that the cord threads of the individual strips extend at an angle to each other, the outer ends of said strips being rounded, and at least one rubberized reinforcing layer of fabric having warp and weft threads and composed of second strips having rounded ends intimately secured to said first strips and extending beyond the entire area defined by said first strips, said strips being arranged in rosettelike shape.

6. A tire patch comprising a reinforcing core consisting of a plurality of layers of substantially parallel rubberized cord threads embedded in rubber and superimposed upon each other so that the cord threads of the individual layers extend at an angle to each other, and at least one rubberized reinforcing layer of fabric having warp and weft threads intimately secured to said reinforcing core and extending beyond the entire area defined by said core, at least some parts of said reinforcing layer merely overlapping said reinforcing core up to but not over the central portion of said core.

7. A tire patch comprising a reinforcing core consisting of a plurality of first strips of substantially parallel rubberized cord threads embedded in rubber and superimposed upon each other so that the cord threads of the individual strips intersect each other at a central part of said core and said strips extend outwardly of said central part and at an angle to each other, and a plurality of second strips of rubberized fabric intimately secured to said first strips and overlapping all outer edges of said first strip and also partly overlapping and secured to said central part but spaced from each other at said central part.

8. A tire patch comprising a reinforcing core consisting of a plurality of strips of substantially parallel rubberized cord threads embedded in rubber and superimposed upon each other so that the cord threads of the individual strips extend at an angle to each other, said strips consisting of alternating rayon cord thread strips and nylon cord threads strips, and at least one rubberized reinforcing layer of fabric having warp and weft threads intimately secured to said strips and extending beyond the entire area defined by said strips.

9. A tire patch comprising a reinforcing core consisting of a plurality of alternating layers of substantially parallel rubberized cord threads of rayon and nylon embedded in rubber and superimposed upon each other so that the cord threads of the individual layers extend at an angle to each other, and at least one rubberized reinforcing layer of fabric having warp and weft threads intimately secured to said reinforcing core and extending beyond the entire area defined by said core.

10. A tire patch comprising a reinforcing core consisting of a plurality of layers of substantially parallel rubberized cord threads embedded in rubber and superimposed upon each other so that the cord threads of the individual layers extend at an angle to each other, at least one rubberized reinforcing layer of fabric having warp and weft threads intimately secured to said reinforcing core and extending beyond the entire area defined by said core, said patch having an outer surface arcuately curved in accordance with the curvature of the inner surface of the part of a tire to be repaired, and tabs connected to said patch serving as handles and adapted to indicate the proper direction in which the patch is to be applied to said tire so that the direction of said cord threads substantially corresponds to the direction of the threads in the tire carcass.

References Cited in the file of this patent

UNITED STATES PATENTS

| | | |
|---|---|---|
| 1,518,466 | Stevenson | Dec. 9, 1924 |
| 2,235,082 | Parker | Mar. 18, 1941 |
| 3,004,580 | Chambers et al. | Oct. 17, 1961 |

FOREIGN PATENTS

| | | |
|---|---|---|
| 648,929 | France | Aug. 21, 1928 |
| 1,242,760 | France | Aug. 22, 1960 |